United States Patent [19]

Amano et al.

[11] Patent Number: 4,845,174

[45] Date of Patent: Jul. 4, 1989

[54] PROCESS FOR PREPARING A VINYL CHLORIDE POLYMER

[75] Inventors: Tadashi Amano, Ibaraki; Junichi Watanabe, Ageo; Hajime Kitamura, Ichihara, all of Japan

[73] Assignee: Shin-Etsu Chemical Co., Ltd., Tokyo, Japan

[21] Appl. No.: 184,098

[22] Filed: Apr. 20, 1988

[30] Foreign Application Priority Data

Apr. 22, 1987 [JP] Japan ................................. 62-98895

[51] Int. Cl.$^4$ ................................................. C08F 2/20
[52] U.S. Cl. ......................................... 526/62; 526/74; 526/200; 526/202
[58] Field of Search ............................ 526/74, 200, 62

[56] References Cited

U.S. PATENT DOCUMENTS 4,380,614 4/1983 Kidoh .................................... 526/62

FOREIGN PATENT DOCUMENTS 141703 6/1986 Japan .

Primary Examiner—Christopher Henderson
Attorney, Agent, or Firm—Oblon, Spivak, McClelland, Maier & Neustadt

[57] ABSTRACT

A process for preparing a vinyl chloride polymer by suspension polymerization with use of (A) a particular partially saponified polyvinyl alcohol having a high polymerization degree and a high saponification degree, (B) a particular hydoxypropyl methyl cellulose and (C) a particular partially saponified polyvinyl alcohol having a low polymerization degree and a low saponification degree as dispersion stabilizers, in a polymerization vessel coated with a scale preventive on its inner wall etc., wherein an (A)Agent/(B)agent ratio is 4/6 to 24/1 in weight ratio; Agent (C) is used in an amount of 0.001 to 0.1% by weight based on the charged monomers; Agent (C) is charged with or after the charging of Agent (A) and (B), and, the particle diameter of Agent (C) in the suspension mixture is controlled to not higher than 100 μm. A vinyl chloride polymer having a high bulk density and high porosity can be produced without formation of polymer scale.

13 Claims, No Drawings

PROCESS FOR PREPARING A VINYL CHLORIDE POLYMER

DETAILED DESCRIPTION OF THE INVENTION

1. Field of the Invention

This invention relates to a process for preparing a vinyl chloride polymer, and, more particularly, to a process for preparing a vinyl chloride polymer having good properties such as high bulk density and high porosity without formation of polymer scales.

2. Description of Prior Art

A number of proposals have hitherto been made in regard to processes for preparing vinyl chloride polymers improved in the workability, having less fish eyes, and having excellent blending properties.

For example, Japanese Unexamined Patent Publication (KOKAI) No. 110797/1977, No. 5886/1977, No. 115890/1977, No. 112210/1980 and No. 6392/1978, and Japanese Patent Publication (KOKOKU) No. 18562/1986 disclose a process in which the so-called oil-soluble polyvinyl alcohols having a saponification degree of 55 mol % or less and an average polymerization degree of 600 or less are used as dispersion stabilizers to increase the porosity of the polymer obtained, improve the workability thereof, and decrease the amount of residual monomers therein.

However, although the above process may truly make higher the porosity of vinyl chloride polymers, it involves the problem that the bulk density is lowered undesirably.

In the suspension polymerization of vinyl monomers including vinyl chloride, it is also practiced to coat a variety of scale preventive agents for the purpose of preventing scales from adhering to the inner wall and so forth of a polymerization vessel. However, this has involved the problem that in instances where the above oil-soluble polyvinyl alcohols are used as dispersion stabilizers, the scale preventing action of the scale preventive agents may be imparied, causing adhesion of scales.

Accordingly, an object of this invention is to provide a process for preparing a vinyl chloride polymer having high bulk density and high porosity, without concurrently generating any scales.

SUMMARY OF THE INVENTION

This invention provides a process for preparing a vinyl chloride polymer, comprising polymerizing vinyl chloride or a vinyl monomer mixture containing vinyl chloride, by suspension polymerization in an aqueous medium in a polymerization vessel coated with an scale preventive agent on the inner wall of the polymerization vessel and other parts thereof with which monomers may come in contact, and comprising charging as dispersion stabilizers:

(A) a partially saponified polyvinyl alcohol having an average polymerization degree of 1,500 to 2,700 and a saponification degree of 75 to 99 mol %;

(B) a hydroxypropyl methyl cellulose having a methoxy-substitution degree of 26 to 30% by weight, a hydroxypropoxy-substitution degree of 4 to 15% by weight, and a viscosity of 5 to 4,000 cP at 25° C. as an aqueous 2% by weight solution thereof; and (C) a partially saponified polyvinyl alcohol having an average polymerization degree of 150 to 600 and a saponification degree of 20 to 55 mol %;

wherein said Agent (A) and Agent (B) are used in an Agent (A)/Agent(B) ratio of 4/6 to 24/1 in weight ratio;

said Agent (C) is used in an amount of 0.001 to 0.1 % by weight based on the charged monomers;

said Agent (C) is charged simultaneously with the charging of said Agent (A) and Agent (B), or after the charging of a part of or the whole of Agent (A) and Agent (B), and, after the charging, the particle diameter of Agent (C) dispersed in the suspension mixture is controlled to 100 μm or less.

According to the preparation process of this invention, a vinyl chloride polymer having particle structure with high porosity, good workability, less residual monomer quantity and good dry-flow behavior of particles can be obtained without concurrently causing adhesion of any scales.

DETAILED DESCRIPTION OF THE INVENTION

The polymerization vessel used in the process for preparing a vinyl chloride polymer of this invention is the one coated previously with an scale preventive agent on the inner wall of the polymerization vessel and other parts thereof with which monomers may come in contact, as exemplified by baffles, stirring blades, etc.

There is no particular limitation in the scale preventive agent used, and it includes, for example dyes, pigments, water-soluble polymers, nitrites, nitrogen-containing aromatic compounds, hetero compounds, iodo compounds, pyrogallol derivatives, phenolic compounds, aromatic amine compounds, etc. Specific compounds of these may include those described, for example, in Japanese Patent Publication (KOKOKU) No. 16084/1971, No. 30343/1970, No. 4753/1971, No. 37988/1970, No. 20821/1971, No. 30835/1970, No. 29795/1973, No. 21672/1972, No. 37306/1976, No. 37308/1976, 24953/1976, No. 6023/1978, No. 6024/1978, No. 6025/1978, No. 6026/1978, No. 21908/1978, No. 28347/1978, No. 28348/1978, No. 46235/1978, No. 1413/1984, No. 13564/1983, No. 5442/1981, No. 5443/1981, No. 5444/1981, No. 34721/1984, No. 11884/1983, No. 6361/1985, No. 31522/1984, No. 48522/1985, No. 48523/1985, No. 1471/1976, No. 1472/1976, No. 59243/1982, No. 5523/1980, No. 22445/1981, No. 22447/1981, No. 31730/1982, No. 47922/1982, No. 59246/1985, No. 25730/1986, No. 24070/1977, No. 4327/1980, No. 12893/1983, No. 14444/1983, No. 14445/1983, No. 14446/1983, No. 14447/1983, No. 42245/1985, No. 21247/1986, No. 842/1986, No. 843/1986, No. 2992/1974, No. 36509/1978, No. 34286/1982, No. 40444/1985 and No. 59247/1985; Japanese Unexamined Patent Publication (KOKAI) No. 195702/1982, No. 198710/1982, No. 11504/1983, No. 180509/1983, No. 180510/1983, No. 78210/1984, No. 20909/1985, No. 50089/1979, No. 101889/1979, No. 21436/1980, No. 73709/1980, No. 98207/1980, No. 112209/1980, No. 8709/1983, No. 61104/1983, No. 168607/1983, No. 180511/1983, No. 204006/1983, No. 71614/1985, No. 54305/1980, No. 54317/1980, No. 192413/1982, No. 192414/1982, No. 129207/1984, No. 7309/1986, No. 108187/1978, No. 184202/1984, No. 202201/1984, No. 210902/1984, No. 47002/1985, No. 71601/1985, No. 72902/1985, No. 96603/1985, No. 233103/1985, No.

31406/1986, No. 34006/1986, No. 51001/1986, No. 51002/1986, No. 155001/1980, No. 155002/1980, No. 112903/1981, No. 69203/1983, No. 101103/1983, No. 103503/1983, No. 210902/1983, No. 11303/1984 and No. 170102/1984; etc.

In this invention, preferably used as the scale preventive agents are those comprising a water-soluble anionic dye, a water-soluble cationic dye and phytic acid in combination, and particularly preferably used are those further comprising monohydric alcohols having 4 to 6 carbon atoms in combination with these.

The water-soluble anionic dyes include water-soluble azo dyes, water-soluble anthraquinone dyes, water-soluble triallylmethane dyes, water-soluble xanthene dyes, water-soluble azine dyes, water-soluble quinoline dyes, water-soluble nitro dyes, water-soluble phthalocyanine dyes, and the like.

The above water-soluble azo dyes are exemplified by C.I. Acid Orange 7, C.I. Acid Red 37, C.I. Acid Red 264, C.I. Acid Blue 113, C.I. Acid Black 1, C.I. Acid Yellow 42, C.I. Acid Blue 158, C.I. Acid Green 12, C.I. Acid Orange 97, C.I. Acid Black 124, C.I. Direct Yellow 50, C.I. Direct Red 37, C.I. Direct Red 2, C.I. Direct Violet 12, C.I. Direct Blue 1, C.I. Direct Brown 1, C.I. Direct Black 77, C.I. Direct Green 1, C.I. Direct Orange 26, C.I. Direct Red 79, C.I. Direct Red 31, C.I. Direct Black 32, C.I. Direct Yellow 12; C.I. Direct Orange 41, C.I. Direct Red 113, C.I. Direct Yellow 28, C.I. Direct Green 26, C.I. Direct Red 81, C.I. Direct Violet 51, C.I. Direct Blue 71, C.I. Direct Brown 37, C.I. Direct Black 19, etc.

The water-soluble anthraquinone dyes are exemplified by C.I. Acid Blue 40, C.I. Acid Red 80, C.I. Acid Green 41; the water-soluble triallylmethane dyes, C.I. Acid Blue 1, C.I. Acid Violet 17, C.I. Acid Green 16, etc.; the water-soluble xanthene dyes, C.I. Acid Red 87, C.I. Acid Red 52, etc; the water-soluble azine dyes, C.I. Acid Blue 59, C.I. Acid Black 2, etc; the water-soluble quinoline dyes, C.I. Acid yellow 3, C.I. Acid Yellow 7, etc.; water-soluble nitro dyes, C.I. Acid Orange 3, C.I. Acid Yellow 1, etc.; the water-soluble phthalocyanine dyes, C.I. Direct Blue 86, etc.; respectively.

The water-soluble cationic dyes are exemplified by water-soluble azine dyes such as C.I. Basic Red 2, C.I. Basic Blue 16 and C.I. Basic Black 2; water-soluble acridine dyes such as C.I. Basic Orange 14 and C.I. Basic Orange 15; water-soluble triphenylmethane dyes such as C.I. Basic Blue 1, C.I. Basic Violet 3, C.I. Basic Blue 26, C.I. Basic Violet 14, C.I. Basic Blue 5 and C.I. Basic Blue 7; water-soluble thiazine dyes such as C.I. Basic Blue 9, C.I. Basic Yellow 1, C.I. Basic Blue 24, C.I. Basic Blue 25 and C.I. Basic Green 5; water-soluble methine dyes such as C.I. Basic Red 12 and C.I. Basic Yellow 11; water-soluble diphenylmethane dyes such as C.I. Basic yellow 2; water-soluble xanthene dyes such as C.I. Basic Violet 10 and C.I. Basic Red 1; water-soluble azo dyes such as C.I. Basic Orange 2 and C.I. Basic Brown 1; water-soluble oxazine dyes such as C.I. Basic Blue 12 and C.I. Basic Blue 6; etc.

The phytic acid compound includes phytic acid (inositol hexaphosphate) and derivatives thereof as exemplified by all sorts of metal salts, all sorts of amine salts, and ammonium salts or the like as described in Japanese Patent Publication (KOKOKU) No. 39957/1977. In respect of the salts thereof, preferred are particularly those which are water-soluble, and no excellent scale preventive effect can be obtained if water-insoluble ones are used.

The monohydric alcohols having 4 to 6 carbon atoms are exemplified by n-butyl alcohol, iso-butyl alcohol, sec-butyl alcohol, t-butyl alcohol, n-amyl alcohol, t-amyl alcohol, iso-amyl alcohol, sec-amyl alcohol, sec-hexyl alcohol, etc. One or more kinds of these may be added in an amount of approximately from 1 to 20% by weight in terms of the concentration in an aqueous solution finally prepared.

On the other hand, the aqueous solution thus prepared can bring about particularly excellent scale preventive effect when it is an acidic aqueous solution of pH 7.0 or less, particularly pH 4.0 or less. As a means for making the solution acidic, methods may be taken such that, of the above phytic acid and salts thereof, particularly a lower salt as exemplified by a salt in which only about 1 to 4 group(s) among 12 hydroxyl groups in 6 phosphoric acid residual groups of the phytic acid has or have formed salt is used in a sufficient quantity, or a suitable acid is added, and this acid is exemplified by sulfuric acid, hydrochloric acid, phosphoric acid, nitric acid, carbonic acid, perchloric acid, molybdic acid, tangstic acid, formic acid, acetic acid, oxalic acid, lactic acid, maleic acid, glycolic acid, thioglycolic acid, etc.

Other preferable scale preventive agents may include nitrogen-containing organic compounds selected from a group of compounds having an azo group, a nitro group, a nitroso group, an azomethine group or an azine ring and amine compounds, which are described in Japanese Patent Publication (KOKOKU) No. 30343/1970, as exemplified by azomethane, azobenzene, nitrobenzene, nitrosobenzene, monoaminomononitroazobenzene, pyrazine, pyridine, thiazine, oxazine, aniline, benzalaniline, EDTA, α-naphthylamine, ethanolamine, diethanolamine, Methylene Blue, Nigrosine Black, Oil Black, Spirit Black and glue; sulfur-containing organic compounds having a thiocarbonyl group, a thioether group or a thioalcohol group, as exemplified by thioglycolic acid, thiouric acid, thiocarbanilic acid, thiocarbamic acid and thiobanzoic acid, all sorts of thioethers represented by the formula:

R—S—R' wherein R and R' are the same or different kind of alkyl groups, and all sorts of mercaptans; quinone compounds such as parabenzoquinone; ketone compounds such as acetone; aldehyde compounds, formaldehyde, acetaldehyde and benzaldehyde; alkanol compounds such as cetyl alcohol and octyl alcohol; all sorts of alizaline dyes; stearic acid; etc.

In the preparation process of this invention, the above Agent (A), Agent (B) and Agent (C) are charged as dispersion stabilizers in the polymerization vessel.

The partially saponified polyvinyl alcohol for Agent (A) having an average polymerization degree less than 1,500 or a saponification degree less than 75 mol % may bring about lowering of the bulk density of the resulting vinyl chloride polymer, and a serious adhesion of scales to the inner wall or the like of the polymerization vessel when used in combination with the partially saponified polyvinyl alcohol of Agent (C) mentioned below. The average polymerization degree thereof more than 2,700 or the saponification degree more than 99 mol % may result in lowering of the porosity of the polymer obtained making larger the quantity of the residual monomers. Thus, the average polymerization degree and saponification degree are required to range from 1,500 to 2,700 and 75 mol % to 99 mol %, respectively.

The hydroxypropyl methyl cellulose of Agent (B) having a methoxy-substitution degree less than 26% by weight or the hydroxypropoxy-substitution degree less than 4% by weight may bring about lowering of the porosity of the polymer obtained. The methoxy-substitution degree thereof more than 30% by weight or the hydroxypropoxy-substitution degree more than 15% by weight may result in a broad particle size distribution of the resulting vinyl type polymer. Therefore the methoxy-substitution degree and the hydroxypropoxy-substitution degree are required to range from 26 to 30% by weight and from 4 to 15% by weight, respectively. The hydroxypropyl methyl cellulose of Agent (B) is required to have a viscosity of 5 to 4,000 cP, preferably 5 to 1,000 cP, at 25° C. The hydoroxypropyl methyl cellulose having a viscosity less than 5 cP may result in lowering of the bulk density of the resulting polymer, and that having a viscosity more than 4,000 cP may result in increase in fish eyes in polymer products obtained from the resulting polymer.

The amounts of Agent (A) and Agent (B) to be charged can be controlled over a wide range depending on the particle diameter of the intended vinyl chloride polymer. Generally, Agent (A) and Agent (B) are used in an amount of 0.005 to 0.5% by weight and 0.001 to 0.5% by weight, respectively, based on the monomers charged. But Agent (A) and Agent (B) are required to be used in a Agent (A)/Agent (B) ratio of 4/6 to 24/1, preferably 6/4 to 24/1, in weight ratio. This ratio otherwise less than 4/6 may result in lowering of the bulk density of the resulting vinyl chloride polymer, and the same otherwise more than 24/1 may result in lowering of the porosity.

The partially saponified polyvinyl alcohol of Agent (C) is required to have an average polymerization degree of 150 to 600, preferably from 200 to 500. The polymerization degree otherwise less than 150 may result in a broad particle size distribution of the resulting polymer, and the same otherwise more than 600 may result in lowering of the porosity. The saponification degree of Agent (C) is required to be of from 20 to 55 mol %, preferably from 30 to 50 mol %. The saponification degree otherwise less than 20 mol % may result in lowering of the bulk density, and the same otherwise more than 55 mol % may result in lowering of the porosity. Agent (C) is required to be charged in an amount of from 0.001 to 0.1% by weight, preferably from 0.005 to 0.05% by weight, based on the amount of the monomers to be charged. This charging amount otherwise less than 0.001% by weight may bring about no effect of improving the porosity, and the same otherwise more than 0.1% by weight may result in lowering of the bulk density.

In the process of this invention, Agent (C) is required to be charged simultaneously with the charging of Agent (A) and Agent (B), or after the charging of a part of or the whole of Agent (A) and Agent (B). The charging in the charging order other than this may result in generation of scales in the polymerization vessel. To charge Agent (C) simultaneously with the charging of Agent (A) and Agent (B), it may be practiced, for example, that before charging, Agent (A), Agent (B) and Agent (C) are dissolved or dispersed in a solvent and thereafter mixed with stirring with use of a preliminary mixing tank, and then charged, or those separately dissolved or dispersed may be mixed in a feeding pipe, and then charged. When Agent (C) is charged after the charging of a part of or the whole of Agent (A) and Agent (B), it is desirable to charge it with appropriate stirring, and also desirable to put Agent (A), Agent (B) and Agent (C) in a dissolved or dispsersed state. In this instance, used as the solvent is an organic solvent or water, provided that water may be sufficient for Agent (A) and Agent (B) as these are water-soluble, and Agent (C) is dissolved in the organic solvent as exemplified by methanol, acetone, methyl ethyl ketone, etc. or dispersed in water to make an aqueous dispersion.

In the process of this invention, after the charging, the particle diameter of Agent (C) in the suspension mixture is required to be controlled to 100 $\mu$m or less, preferably 30 $\mu$m or less. The particle size otherwise larger than 100 $\mu$m may make scales liable to be generated in the polymerization vessel. To control the particle diameter to 100 $\mu$m or less, in the instance where Agent (C) is charged in the form of the aqueous suspension, the temperature of the water used in preparing the aqueous suspension or such an aqueous suspension may be controlled to 50° to 90° C. In the instance where it is dissolved in the solvent such as methanol and acetone and charged, the particle diameter of Agent (C) formed in the system after charged can be controlled by changing the stirring rate, stirring time, temperature, etc. of the suspension mixture in the polymerization vessel. If the monomers have not yet been charged, the temperature in the polymerization vessel can be changed in the range of from 20° to 70° C.

The monomers that are polymerized by the process of this invention include vinyl chloride used alone, and besides monomer mixtures chiefly comprised of vinyl chloride (usually, 50% by weight or more of vinyl chloride). Comonomers copolymerized with this vinyl chloride are exemplified by vinyl esters such as vinyl acetate and vinyl propionate, acrylates or methacrylates such as methyl acrylate and ethyl acrylate, olefins such as ethylene and propylene, maleic anhydride acrylonitrile, styrene, vinylidene chloride, and other monomers copolymerizable with vinyl chloride.

Other polymerization conditions in the process of this invention may be the same as those in the manufacture of conventional vinyl chloride polymers, and a polymerization initiator includes, for example, percarbonate compounds such as diisopropyl peroxydicarbonate, di-2-ethylhexyl peroxydicarbonate and diethoxyethyl peroxydicarbonate; perester compounds such as t-butyl peroxyneodecanate, $\alpha$-cumyl peroxyneodecanate and t-butyl peroxyneodecanate; peroxides such as acetylcyclohexylsulfonyl peroxide and 2,4,4-trimethylpentyl 2-peroxyphenoxyacetate; azo compounds such as azobis-2,4-dimethylvaleronitrile, azobis(4-methoxy-2,4-dimethylvaleronitrile; and further potassium persulfate, ammonium persulfate, hydrogen peroxide, etc.; which can be used alone or in combination of two or more of these. If necessary, there can also be added polymerization degree modifiers, pH-adjusters, etc., and also can be added a small amount of surface active agents depending on the purpose.

This invention will be described below in greater detail with reference to examples.

EXAMPLES

Example 1

The inner wall, blades and baffles of an autoclave having a capacity of 100 lit. were uniformly coated with a toluene solution of monoaminomononitroazobenzene, and dried.

Next, 60 kg of pure water were charged in this autoclave, and charged therein was a homogenous mixture obtained by dissolving in 1 lit. of pure water 12 g of Agent (A), partially saponified polyvinyl alcohol having a polymerization degree of 2,550 and a saponification degree of 80 mol %, and 3.0 g of Agent (B), hydroxypropyl methyl cellulose having a methoxy-substitution degree of 29% by weight, hydroxypropoxy-substitution degree of 10% by weight and a viscosity of 50 cP at 25° C. as an aqueous 2% by weight solution thereof. To the mixture, added were a solution obtained by dissolving in 50 ml of methanol 3 g of Agent (C), partially saponified polyvinyl alcohol having an average particle diameter of 500 μm, a polymerization degree of 235 and a saponification degree of 48 mol %. The particle diameter of Agent (C) was measured after the aqueous suspension became uniform. Thereafter, evacuation was effected by means of a vacuum pump until the inner pressure of the autoclave was made to be −700 mmHg. After the evacuation, 30 kg of vinyl chloride monomer was charged and 12.6 g of di-2-ethylhexyl peroxydicarbonate were further charged as a polymerization initiator, to carry out polymerization at 57° C. The reaction was stopped at the time when the inner pressure fell to 6.0 km$^2$/cm$^2$G, and then unreacted monomers were recovered, followed by dehydration and drying to obtain a polymer.

On the polymer obtained, measured were bulk density, particle size distribution, dioctyl phthalate (DOP) absorption rate and residual monomer quantity. Results obtained are shown in Table 1. In respect of the particle size distribution, sieves with mesh of 60, 100 and 200 were provided for use to examine the proportion (% by weight) held in the whole, of the particles having passed the sieves in order of from the 60 mesh sieve (undersize distribution).

Example 2

Example 1 was repeated to carry out polymerization, except that the amounts for charging Agent (A) and Agent (B) in Example 1 were changed as shown in Table 1, and the respective characteristics of the polymer obtained were measured. Results obtained are shown in Table 1.

Example 3 and 4

The inner wall, blades and baffles were coated with an aqueous solution obtained by dissolving 1 g of C.I. Direct Blue 1 and 0.2 g of C.I. Basic Blue 12 in 1,000 ml of deionized water and further adding 1.7 g of phytic acid, and dried for 10 minutes at 50° C., followed by washing with water. Thereafter, polymerization was carried out in the same manner as in Example 1, and the respective characteristics of the polymer obtained were measured. Results obtained are shown in Table 1.

Comparative Example 1

Example 1 was repeated to carry out polymerization, except that the charging order in Example 1 was changed for the order that Agent (C) was first charged and then Agent (A) and Agent (B) were charged, and the respective characteristics of the polymer obtained were measured. Results obtained are shown in Table 1.

Comparative Example 2

Example 1 was repeated to carry out polymerization, except that the charging order in Example 1 was changed for the order that Agent (A) and Agent (B) were first charged and then Agent (C) was charged with stirring, and that Agent (C) the one having an average particle diameter of 500 μm was used as it is, that is, without dissolving in methanol, and the respective characteristics of the polymer obtained were measured. Results obtained are shown in Table 1.

Comparative Example 3

Example 1 was repeated to carry out polymerization, except that Agent (A) in Example 1 was replaced by a partially saponified polyvinyl alcohol having a polymerization degree of 750 and a saponification degree of 72.3 mol %, and the respective characteristics of the polymer obtained were measured. Results obtained are shown in Table 1.

Comparative Example 4

Example 1 was repeated to carry out polymerization, except that the amounts for charging Agent (A), Agent (B) and Agent (C) were changed as shown in Table 1, and the respective characteristics of the polymer obtained were measured. Results obtained are shown in Table 1.

Comparative Example 5 and 6

Example 1 was repeated to carry out polymerization, except that the amount for charging Agent (C) was changed as shown in Table 1, and the respective characteristics of the polymer obtained were measured. Results obtained are shown in Table 1.

TABLE 1

|  | Examples | | | | Comparative Examples | | | | | |
| --- | --- | --- | --- | --- | --- | --- | --- | --- | --- | --- |
|  | 1 | 2 | 3 | 4 | 1 | 2 | 3 | 4 | 5 | 6 |
| Agent (A)/Agent (B): (weight ratio) | 8/2 | 24/1 | 4/6 | 9/1 | 8/2 | 8/2 | 9/1 | 1/9 | 8/2 | 8/2 |
| Agent (A) + Agent (B): (wt. %)* | 0.05 | 0.06 | 0.04 | 0.06 | 0.05 | 0.05 | 0.10 | 0.03 | 0.05 | 0.05 |
| Agent (C) (wt. %)*: | 0.01 | 0.015 | 0.01 | 0.012 | 0.01 | 0.01 | 0.01 | 0.01 | 0.00067 | 0.2 |
| Particle diameter of Agent (C) in suspension mixture (μm): | 10 | 15 | 16 | 14 | 22 | 150 | 25 | 23 | 10 | 10 |
| Bulk density (kg/lit): | 0.545 | 0.555 | 0.544 | 0.550 | 0.542 | 0.537 | 0.489 | 0.491 | 0.544 | 0.482 |
| Particle size distribution: (mesh undersize %) | | | | | | | | | | |
| 60 | 100 | 100 | 100 | 100 | 98.2 | 96.1 | 100 | 100 | 100 | 100 |
| 100 | 34.1 | 29.1 | 54.1 | 52.3 | 22.3 | 17.2 | 62.1 | 57.9 | 30.2 | 72.4 |
| 200 | 0.3 | 0.2 | 0.4 | 0.4 | 0.1 | 0.1 | 0.7 | 0.6 | 0.1 | 1.0 |
| DOP absorption rate (wt. %): | 24.8 | 24.2 | 25.0 | 24.7 | 24.2 | 22.6 | 24.9 | 25.1 | 18.1 | 25.9 |
| Residual monomer quantity: (ppm) | 0.1 | 0.1 | 0.1 | 0.1 | 0.3 | 2.7 | 0.1 | 0.1 | 34 | 0.1 |

TABLE 1-continued

|  | Examples | | | | Comparative Examples | | | | | |
| --- | --- | --- | --- | --- | --- | --- | --- | --- | --- | --- |
|  | 1 | 2 | 3 | 4 | 1 | 2 | 3 | 4 | 5 | 6 |
| Adhesion of scales: | (X) | (X) | (X) | (X) | (Y) | (Y) | (Y) | (Y) | (X) | (Y) |

*Based on the charged amount of monomers
(X) Little ocurred
(Y) Ocurred on almost all the surfaces inside the polymerization vessel

What is claimed is:

1. A process for preparing a vinyl chloride polymer, comprising:
   polymerizing vinyl chloride or a vinyl monomer mixture containing vinyl chloride by suspension polymerization in an aqueous medium in a polymerization vessel whose inner wall and other parts thereof with which the monomers may come into contact are coated with a scale preventive agent; and
   charging into said aqueous medium a mixture of dispersion stabilizers of
   (a) a partially saponified polyvinyl alcohol having an average polymerization degree of 1500 to 2700 and a saponification degree of 75 to 99 mol %;
   (b) a hydroxypropyl methyl cellulose having a methoxy-substitution degree of 26 to 30% by weight, a hydroxypropoxy-substitution of 4 o 15% by weight, and a viscosity of 5 to 4,000 cP at 25° C. as an aqueous 2% by weight solution thereof; and
   (c) a partially saponified polyvinyl alcohol having an average polymerization degree of 150 to 600 and a saponification degree of 20 to 55 mol %, wherein the weight ratio of component (a) to component (b) ranges from 4/6 to 24/1, the amount of said component (c) ranges from 0.001 to 0.1% by weight based on the weight of charged monomers, said component (c) being charged simultaneously with component (a) and component (b) into the reaction mixture or after at least a portion of component (a) and component (b) are charged, and, after the charging of the dispersion stabilizer ingredients, the particle diameter of component (c) dispersed in the dispersion mixture being controlled to a size not greater than 100 μm.

2. The process of claim 1, wherein said scale preventive agent is a mixture of a combination of a water-soluble anionic dye, a water-soluble cationic dye and phytic acid.

3. The process of claim 1, wherein said water-soluble anionic dye is a water-soluble azo dye, a water-soluble anthraquinone dye, a water-soluble triallylmethane dye, a water-soluble xanthene dye, a water-soluble azine dye, a water-soluble quinoline dye, a water-soluble nitro dye or a water-soluble phthalocyanine dye.

4. The process of claim 1, wherein said water-soluble cationic dye is a water-soluble azine dye, a water-soluble acridine dye, a water-soluble triphenylmethane dye, a water-soluble thiazine dye, a water-soluble methine dye, a water-soluble diphenylmethane dye, a water-soluble xanthene dye, a water-soluble azo dye or a water-soluble oxazine dye.

5. The process of claim 2, wherein said scale preventive agent further comprises a monohydric alcohol having from 4 to 6 carbon atoms.

6. The process of claim 1, wherein said component (c) has an average polymerization degree of 200 to 600 and a saponification degree of 30 to 50 mol %.

7. The process of claim 1, wherein the weight ratio of component (a) to component (b) ranges from 6/4 to 24/1.

8. The process of claim 1, wherein the amounts of components (a) and (b) range from 0.005 to 0.5% by weight and 0.001 to 0.5% by weight respectively, based on the monomers charged to the reaction.

9. The process of claim 1, wherein said component (c) is present in the reaction medium in an amount of from 0.005 to 0.05% by weight based on the amount of monomers charged to the reaction medium.

10. The process of claim 1, wherein the particle diameter of component (c) in the suspension is controlled to 30 μm or less.

11. The process of claim 1, wherein said component (a), component (b) and/or component (c) is charged to the reaction medium as an aqueous suspension.

12. The process of claim 1, wherein the temperature of polymerization ranges from 20° to 70° C.

13. The process of claim 1, wherein the vinyl monomer mixture in addition to vinyl chloride contains at least one monomer selected from the group consisting of vinyl esters, vinyl (meth)acrylates, an olefin, maleic anhydride, acrylonitrile, styrene and vinylidene chloride.

* * * * *